Feb. 7, 1933.  R. I. BAGNALL  1,896,995
MEANS FOR VOLTAGE REGULATION IN ALTERNATING CURRENT SUPPLIES
Filed May 1, 1931
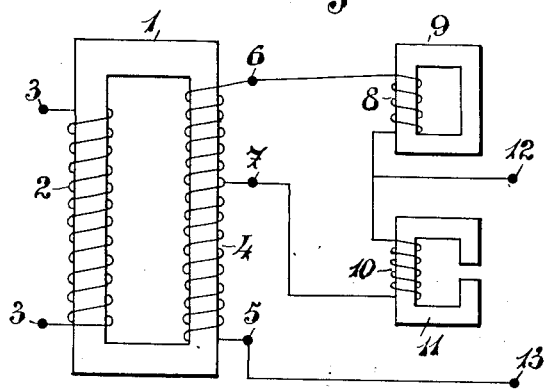
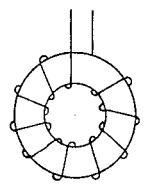
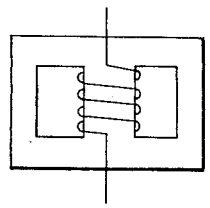
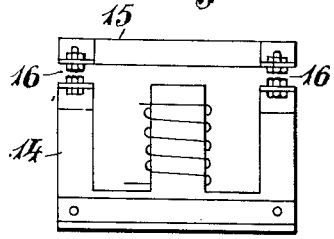
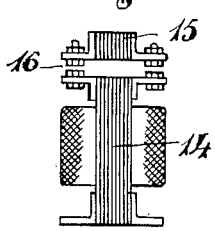
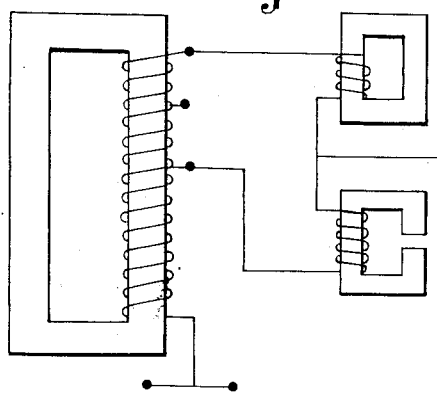
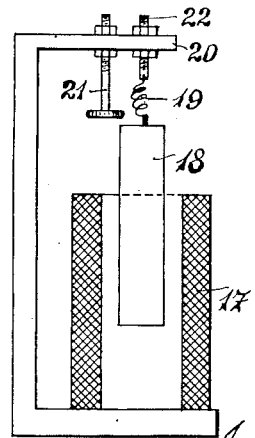
Inventor
Robert I. Bagnall
by Herbert W. Jenner
Attorney Patented Feb. 7, 1933

1,896,995

UNITED STATES PATENT OFFICE

ROBERT IRONSIDE BAGNALL, OF LONDON, ENGLAND

MEANS FOR VOLTAGE REGULATION IN ALTERNATING CURRENT SUPPLIES

Application filed May 1, 1931, Serial No. 534,501, and in Great Britain May 8, 1930.

This invention relates to voltage regulating systems for alternating current supplies of the kind wherein use is made of reactors having windings connected between the load circuit and separate tappings on the windings of a transformer.

With such regulating systems hitherto known it has been necessary to employ separate magnetizing windings on the reactors and somewhat complicated electrical means externally for varying the current in the magnetizing windings and thereby the inductances of the reactors in order to attain the desired voltage regulating effects.

Now the present invention has for its object to provide an improved method and simplified means for the automatic regulation of voltage in alternating current supplies and is characterized primarily by the employment of choke coils of dissimilar electromagnetic characteristics making connection between the load circuit and the tappings upon the transformer winding.

According to this invention use is made of simple choke coils of dissimilar electro-magnetic characteristics connected between the load circuit and the tappings on the transformer winding and operating automatically in a manner whereby the voltage regulation arises from the effect of the choke coils and transformer alone.

The improved regulating system may according to design be arranged to give a voltage characteristic which rises, or falls or is approximately constant with increasing current and is therefore especially suitable for the purpose of overcoming or compensating for the drop in voltage which may occur with increasing load in cables, transformer and the like.

In carrying the invention into practical effect as for the purpose of compensating the voltage drop arising in cables and transformer windings, use is made of a transformer having tappings capable of giving electrical pressures above and below that required in the consumption circuit which is connected on the one hand directly to one end of the transformer winding and on the other hand through the two dissimilar chokes to the tappings on the transformer winding. In the example under consideration the choke coil connected to the tapping point of excessive pressure preferably has a closed circuit core which saturates at relatively low current values whilst the other choke coil connected to the tapping point of lower electrical pressure possesses a lower magnetic induction, its core preferably being gapped or discontinuous in order to assist in procuring the required characteristic. The two choke coils may be regarded as arranged in series and bridged across the tappings of the transformer, the potential of the load circuit being determined by the voltage existing at the point common to the two choke coils. At no load, the choke of high induction absorbs a certain part of the pressure between the tappings but as the current increases the voltage of the choke of low magnetic induction increases more rapidly than the voltage of the choke of high induction by an amount which may be arranged to compensate for the drop of pressure occurring in the cables and transformer windings.

The invention is hereinafter more fully described with reference to the accompanying drawing wherein:—

Fig. 1 shows diagrammatically an example of the improved voltage regulating system with a double wound transformer;

Figs. 2 and 3 are diagrammatic views of different forms of choke coils;

Figs. 4 and 5 are respectively front and side elevation illustrating a choke coil of variable magnetic induction.

Fig. 6 is a diagram illustrating a modified arrangement of the voltage regulating system with an auto-transformer.

Fig. 7 shows diagrammatically a further form of choke coil of variable magnetic induction.

Referring to Figure 1 the apparatus shown comprises a double wound transformer 1 having a primary winding 2 with terminals 3 adapted to be connected with a source of supply of alternating current (not shown) and a secondary winding 4 whose full pressure between the terminals 5 and 6 at no load exceeds that required in the load circuit. The secondary winding 4 is also provided with a tapping 7 which yields a pressure with reference to the terminal 5 below that required in the load circuit. The system also includes two choke coils whose windings 8 and 10 are connected at one end to the terminal 6 and the tappings 7 respectively and at the other end to one feeder 12 for the load circuit. The other feeder 13 for the load circuit is connected to the terminal 5 of the transformer winding.

The choke coil 8 is provided with a laminated iron core 9 forming a closed magnetic circuit, whilst the choke coil 10 is preferably provided with a core 11 of gapped or discontinuous form. The exact design of the cores and windings of the choke coil will depend on such factors as the amount and nature of the load to be dealt with and the amount of voltage drop to be compensated between no load and full load conditions.

It will be seen that the two windings 8 and 10 are connected in series with one another to points 6 and 7 of the transformer secondary coil, so that when the transformer primary is energized and no current consuming device is connected to the outgoing terminals 12 and 13 a current will pass through the choke coil windings, and the voltage measured between terminals 6 and 7 will be divided between the two coils 8 and 10 to a degree depending principally on the relative inductance of the two choke coils at that current. The choke coils are so designed and proportioned and the tapping point 7 and full pressure at the terminal 6 are so arranged that the voltage then obtained between terminals 12 and 13 is that which it is desired to supply from the outgoing terminals when no load is connected to them, and in this condition neither of the choke coil cores should be saturated magnetically, and the current passing through their coils should preferably be as small as possible compared with the maximum current required by the consuming devices consistent with satisfactory operating characteristics of the apparatus at varying loads.

The choke coil 8 is made so that a large increase in current requires a relatively small increase in voltage across the choke coil terminals. This is secured by using a suitable value of induction or density of magnetization in the core. The choke coil 10 on the other hand is made so that a greater proportional increase in voltage is required at its terminals when an increased current passes through its windings than is the case with choke coil 8, and to obtain this result the core may be worked at a lower induction than that used in the core of choke coil 8 when considered in reference to the no load condition an air gap in the magnetic circuit assists in obtaining this result.

Although the cores of these choke coils are described as being constructed of iron, it is to be understood that other materials such as alloys having suitable characteristics may be used instead, and the exact value of induction in their magnetic circuits especially of choke coil 8 will depend on the magnetic characteristics of the material used for the cores.

When a load in the form of a current consuming device is connected to the outgoing terminals 12 and 13 increased current will pass through winding 8 causing an increase in voltage across the terminals 6 and 12. The method of operation will be best understood if considered in relation to a load of a nature as to have approximately unity power factor, in which case a considerable angle will exist between the vector of its voltage and the vector of the voltage across the terminals of choke coil 8. There will then be an increase also in voltage at the terminals of the choke coil 10 and therefore the current through choke coil 10 will be increased.

By suitable design these respective increases in voltage on the two choke coils may be so arranged to ensure that the voltage obtained between the outgoing terminals 12 and 13 will increase as the load connected to them is increased up to a point representing the full capacity of the apparatus, thereby compensating approximately at all values the voltage drop occurring in the conductors.

It may here be mentioned that the transformer employed may be of any ordinary commercial form and although as illustrated diagrammatically in Figure 1 it is shown as having primary and secondary windings on separate limbs it would be made in accordance with usual and well known practice so as to be efficient and convenient for its purpose. Furthermore the choke coil 8 may be of any convenient form. Thus its windings may be mounted on a core of closed rectangular form as shown in Figure 1 or the laminated core may be of annular form as shown in Figure 2 or of the shell type indicated in Figure 3.

The core 11 of the choke coil 10 may be constructed with a fixed or an adjustable air gap. Figures 4 and 5 show a form of construction wherein the core comprises a main portion 14 composed of laminations bolted or otherwise suitably held together, and a similarly constructed yoke portion 15. The winding of the choke coil surrounds one of the limbs of the main portion 14 of the core and yoke 15 is connected to the main portion of the coil by distance bolts 16 in a manner permitting the air gap between the parts to be adjusted for the purpose of varying the electro-magnetic characteristics of the choke coil.

Figure 6 shows diagrammatically a voltage regulating system which is precisely similar to that described with reference to Figure 1 except that it is provided with an auto-transformer instead of with a double wound transformer. In this case the same winding is connected by appropriate tappings with the source of supply and also with the load circuit and the regulating choke coils.

In some conditions it may be desirable to use as an alternative to the form of choke coil 10 indicated in Figure 1 a construction in which the iron core or some part of it is supported so as to be capable of movement under the control of a weight or spring. One form of this construction is shown diagrammatically in Figure 7, where 17 is the coil winding and 18 the core, which is suspended partly within the coil by the spring 19 from a support 20. Means may be provided for adjusting the initial position of the core such as a stop 21 and for adjusting the tension of the spring such as a screwed stem and nuts or the like 22.

These parts are adjusted so that as the current passing through the coil increases when load is connected to the terminals 12 and 13 the core is attracted further into the coil thus increasing the inductance of the choke coil.

Although in the foregoing description the application of the improved voltage regulating system to single phase supplies only is considered it should be understood that the regulating system is equally adaptable to multi-phase supplies. Thus for example in a three-phase supply three regulating systems arranged as described might have their transformers windings star connected whereupon the regulated three-phase supply would be available at the points of connection between the choke coils.

Having now particularly described my invention what I claim as new and desire to protect by Letters Patent is:—

1. Means for the automatic regulation of voltage in alternating current supplies comprising a supply transformer having tappings giving pressures respectively above and below a predetermined normal pressure in a load circuit, a choke coil having permanent high electro-magnet induction characteristics connected between the high pressure tapping and the load circuit and a choke coil of permanent lower electro-magnetic induction characteristic connected between the low pressure tapping and the load circuit, said choke coils co-operating in determining automatically the pressure applied to the load circuit for any current consumption of given amount and type.

2. Means for the automatic regulation of voltage according to Claim 1, wherein the choke coil connected to the tapping point of higher pressure is constructed with a closed circuit magnetic core, and the choke coil connected to the tapping point of lower pressure is constructed with a gapped or discontinuous core.

In witness whereof I affix my signature.
ROBERT IRONSIDE BAGNALL.